No. 820,731. PATENTED MAY 15, 1906.
O. S. PHELPS.
CRANK.
APPLICATION FILED OCT. 16, 1905.
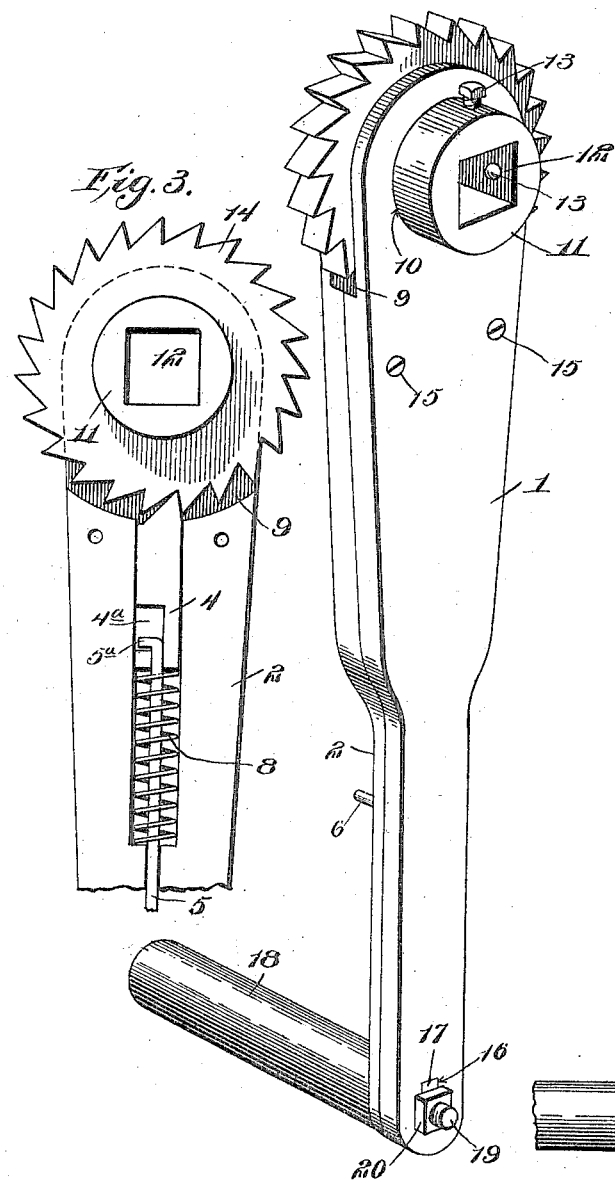
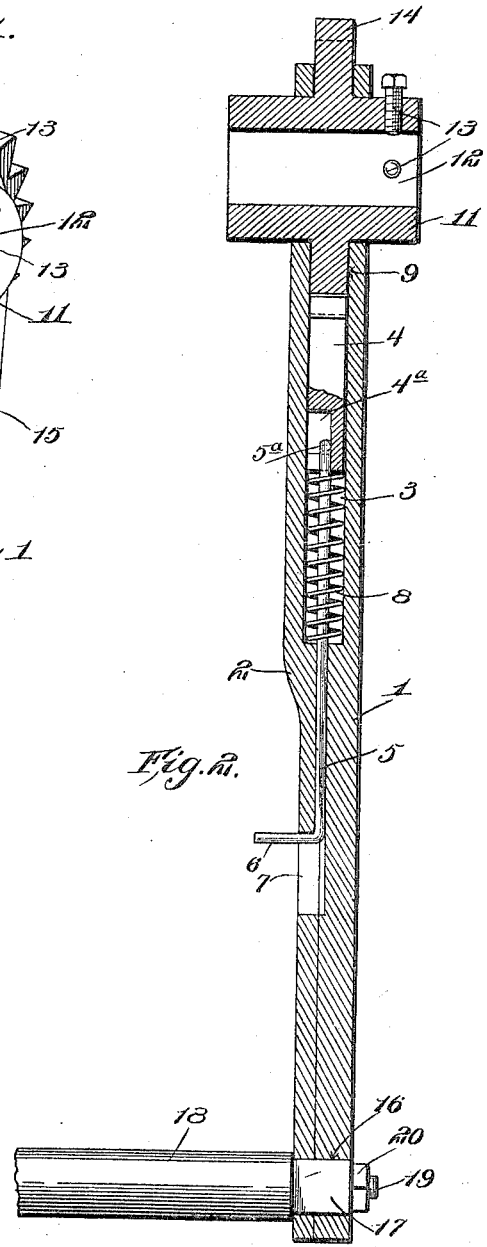
Inventor
Ono S. Phelps
Witnesses
Louis R. Heinrichs
Herbert D. Lawson
By W. J. FitzGerald & Co.,
Attorneys

UNITED STATES PATENT OFFICE.

ONO SETH PHELPS, OF MAPLETON, OREGON.

CRANK.

No. 820,731.  Specification of Letters Patent.  Patented May 15, 1906.

Application filed October 16, 1905. Serial No. 283,058.

*To all whom it may concern:*

Be it known that I, ONO SETH PHELPS, a citizen of the United States, residing at Mapleton, in the county of Lane and State of Oregon, have invented certain new and useful Improvements in Cranks; and I do hereby declare the following to be a full, clear, and exact description of the invention, such as will enable others skilled in the art to which it appertains to make and use the same.

My invention relates to cranks for manually-operated mechanisms of various kinds; and it is more particularly adapted for use in connection with logging-jacks.

The object of the invention is to combine in a crank mechanism means whereby it may be fastened to the shaft to be rotated thereby and to provide means which enable the crank to be swung backward and forward, so as to rotate the shaft only when the crank is swung in one direction.

A still further object is to provide simple means for disengaging the crank from the shaft, so that it will not rotate therewith should the shaft turn in either direction.

With the above and other objects in view the invention consists of an arm formed of oppositely-disposed contacting members having a grip at one end and a barrel rotatably mounted in the other end. This barrel has means for securing it to the shaft adapted to be inserted thereinto, and a ratchet formed integral with and extending around the barrel is normally engaged by a spring-pressed dog which is disposed between the members of the arm. An actuating device extends from the dog and through the arm, so that the same can be readily pulled out of engagement with the ratchet.

The invention also consists of certain other novel features of construction and combination of parts.

In the accompanying drawings I have shown the preferred form of my invention.

In said drawings, Figure 1 is a perspective view of a crank constructed in accordance with my invention. Fig. 2 is a central longitudinal section therethrough; and Fig. 3 is an inner elevation of a portion of one of the members and showing the dog, barrel, and ratchet in position therein.

Referring to the figures by numerals of reference, 1 and 2 are oppositely-disposed members the adjoining faces of which contact, and each of these members has a longitudinally-extending recess 3 therein, the two recesses registering to form a socket in which is located a dog 4. This dog 4 has a rod 5 extending therein and terminating in a lateral extension 6, which projects into a slot 7, formed in the member 2, and constitutes a handle whereby the dog 4 may be drawn back to the inner end of the socket in which it is located. The rod lies in an angular recess $4^a$, formed in one face of the dog, and is angular at its end, as shown at $5^a$, so that when the rod is drawn longitudinally the dog is pulled with it; but the dog is capable of moving back without correspondingly moving the rod. The walls of the recesses 3 prevent the rod from leaving the recess $4^a$. A coiled spring 8 surrounds that portion of the rod 5 located within the socket and is adapted to be compressed when the dog is retracted and to normally project said dog from the socket. The socket opens into a slot 9, which is formed between the members 1 and 2 at one end, and these members have circular openings 10 in the walls of the slot and in which is rotatably mounted a cylindrical barrel 11, preferably provided with a rectangular passage 12 therethrough. Set-screws 13 are mounted within the barrel and are so disposed as to project from a plurality of the walls of the passage 12, so as to clamp upon a shaft or other object placed within the barrel.

Formed with the barrel and extending therearound within slot 9 is a ratchet-wheel 14, and the teeth of this ratchet are normally engaged by the dog 4, which is held in contact therewith by spring 8. The end of the dog contacting with the teeth is beveled in such a manner that the teeth when rotated in one direction will slip thereover, but when turned in the other direction will abut against the dog and be held against movement. The two members 1 and 2 are held together in any preferred manner, as by means of screws 15, and the ends thereof farthest removed from the barrel 11 have a slot 16, in which is mounted an angular extension 17, formed at one end of a grip 18. A threaded stem 19 projects from extension 7, and a nut 20 is located thereon and serves to hold the grip 18 in position upon the members 1 and 2.

In using the crank herein described the same is placed with the barrel 11 upon the element to be rotated, and said barrel is rigidly connected to the element by means of the set-screws 13. The crank can then be swung backward and forward, and when moving in one direction the dog 4 will engage the ratchet 14 and cause it to rotate, and when the lever is swung in the other direction the dog will slide from the teeth and said ratchet and the barrel will not, therefore, be actuated. In this way the barrel 11 and the element therein can be rotated in one direction by the oscillating movement of the crank. Should it be desired to release the barrel 11, so that the same can rotate in either direction independently of the crank, the extension 6 of rod 5 is pulled longitudinally within the slot 7, so as to withdraw the dog 4 from engagement with the ratchet 14. Spring 8 will be compressed by this operation, and as soon as the extension 6 is released the spring will return the dog to its normal position.

Having thus fully described my invention, what I claim as new, and desire to secure by Letters Patent, is—

A crank of the character described comprising oppositely-disposed members having registering recesses, a grip extending through said members at one end and binding the members together, a barrel rotatably mounted in the other end of the members, a ratchet integral with and surrounding the barrel, said ratchet extending between the members, a spring-pressed dog slidably mounted within the registering recesses and normally engaging the ratchet, said dog having an angular recess therein, a stem slidably mounted between and extending laterally from the members, said stem projecting through the spring, and an angular extension upon one end of the stem and slidably mounted within but non-detachable from the dog, said dog being capable of longitudinal movement independent of the stem.

In testimony whereof I have signed my name to this specification in the presence of two subscribing witnesses.

ONO SETH PHELPS.

Witnesses:
LEONARD TABOR,
JOS. SLEMMONS.